(12) United States Patent
Lee

(10) Patent No.: US 7,764,329 B2
(45) Date of Patent: Jul. 27, 2010

(54) MVA LCD DEVICE AND PIXEL CIRCUIT THEREOF

(75) Inventor: Seok-Lyul Lee, Hsin-Chu (TW)

(73) Assignee: AU Optronics Corp., Hsin-Chu (TW)

(*) Notice: Subject to any disclaimer, the term of this patent is extended or adjusted under 35 U.S.C. 154(b) by 788 days.

(21) Appl. No.: 11/607,026

(22) Filed: Dec. 1, 2006

(65) Prior Publication Data

US 2007/0126940 A1 Jun. 7, 2007

(30) Foreign Application Priority Data

Dec. 2, 2005 (TW) .............................. 94142441 A
Apr. 7, 2006 (TW) .............................. 95112339 A

(51) Int. Cl.
*G02F 1/136* (2006.01)
*G02F 1/1343* (2006.01)
*G02F 1/1337* (2006.01)

(52) U.S. Cl. ........................... 349/48; 349/39; 349/129; 349/144

(58) Field of Classification Search .................... 349/39, 349/48, 129, 130, 144

See application file for complete search history.

(56) References Cited

U.S. PATENT DOCUMENTS

2005/0219186 A1* 10/2005 Kamada et al. ............... 345/90
2008/0117156 A1* 5/2008 Chen et al. .................... 345/92

FOREIGN PATENT DOCUMENTS

JP P2004-62146 A 2/2004
JP P2004-258139 A 9/2004

* cited by examiner

*Primary Examiner*—Uyen-Chau N Le
*Assistant Examiner*—John M Bedtelyon
(74) *Attorney, Agent, or Firm*—Bacon & Thomas, PLLC

(57) ABSTRACT

A MVA LCD device and a pixel circuit thereof are disclosed. Each pixel is divided into a first sub-pixel unit and a second sub-pixel unit. One terminal of the storage capacitance of the first sub-pixel unit is electrically connected to a coupling signal line, which is used for providing a coupling electrode voltage. One terminal of the storage capacitance of the second sub-pixel unit is electrically connected to the storage bus line which is used for providing a common voltage. Therefore, the pixel voltage of the first sub-pixel unit is different from the pixel voltage of the second sub-pixel unit through controlling the different coupling electrode voltage.

20 Claims, 13 Drawing Sheets

MVA LCD DEVICE AND PIXEL CIRCUIT THEREOF

BACKGROUND OF THE INVENTION

1. Field of the Invention

The present invention relates to a pixel circuit of a liquid crystal display device, and, more particularly, to a pixel circuit of a multi-domain vertical alignment liquid crystal display device.

2. Description of Related Art

Currently, a mode most widely adopted for the TFT LCD is a normally-white mode that is implemented in a twisted nematic (TN) LCD. The technology of manufacturing the TN TFT LCD has outstandingly advanced in recent years. Contrast and color reproducibility provided by the TN TFT LCD have surpassed those offered by the CRT The color saturation of the TN-LCD device is better than that of the conventional display devices (e.g. the CRT display devices). However, despite the related TN technologies improve a lot recently, the disadvantage of the TN-LCD devices such as narrow viewing angle still needs to be improved. Moreover, the application of the TN-LCD device is also limited by the disadvantage of the narrow viewing angle.

On the other hand, as the liquid crystal molecules are driven in a VA mode, the liquid crystal molecules do not be rotated without applying electrical field, The light from the backlight module won't pass through the liquid crystal layer and the polarizer, and then display a black screen, i.e. the "normally black".

Generally, the contrast of the VA-LCD is higher than that of the TN-LCD. The response speed of the VA-LCD is faster than that of the TN-LCD. Furthermore, the viewing angle of the VA-LCD is wider than that of the TN-LCD. Hence, VA-LCD attracts people's attraction recently.

However, the distribution of the brightness of the VA-LCD is not homogeneous, because each liquid crystal molecule has a character of the birefringence.

FIG. 1 is the schematic view of a pixel 1 of a conventional multi-domain vertical alignment (MVA) liquid crystal display device. The conventional MVA-LCD device comprises a first substrate 11 and a second substrate 12. A liquid crystal layer with a plural of liquid crystal molecules 141, 142, 143, 144 is interposed between the first substrate 11 and the second substrate 12. A top electrode 111 is formed on the surface of the first substrate 11, and moreover, several protrusions 13 are formed on the surface of the first substrate 11. On the other hand, several pixel electrodes 121 and plural slits 15 are formed on the surface of the second substrate 12. Each slit 15 is located between the pixel electrodes 121.

Since the average tilted angle of the whole pixels of the conventional MVA LCD of the same gray level is identical, the tilted angle of the liquid crystal molecules of a sub-pixel is identical. In other words, the tilted angle of the liquid crystal molecules 141, 142 is as same as that of the liquid crystal molecules 143, 144 in FIG. 1.

FIG. 2 is schematic view of a pixel of a conventional MVA LCD. The circuit of the pixel 2 of the conventional MVA LCD comprises two sub-pixels 21, 22. The sub-pixel 21 further comprises a thin film transistor 211, a storage capacitor (Cs1) 212, a common voltage 213, and a liquid crystal capacitor (Clc) 214. The sub-pixel 22 further comprises a thin film transistor 221, a storage capacitor (Cs2) 222, a common voltage 223, and a liquid crystal capacitor (Clc) 224.

The common voltages (Vcom) 213, 223 is provided by a storage bus line, where the provided common voltage is a constant. The liquid crystal capacitor 214, 224 comprises a top electrode, a pixel electrode, and a liquid crystal layer interposed between the top electrode and the pixel electrode. The pixel electrode provides the operational voltage for operation. Hence, by controlling the difference between the operational voltage and the common voltage, the electrical field of the liquid crystal layer, or even the rotation of the liquid crystal molecules can be controlled.

Since the common voltages applied on one terminal of the storage capacitor 212, 222 are identical, and the capacitances of the liquid crystal capacitor 214, 224 are almost the same, the tilted angles of the liquid crystal molecules of the sub-pixels 21, 22 are almost the same under the same gray level. Hence, the distribution of the brightness of the conventional multi-domain vertical alignment liquid crystal display device is not homogeneous. The display quality of the conventional multi-domain vertical alignment liquid crystal display device deteriorates, too.

To overcome the problem illustrated above, Japan Patent Application Publications Nos. JP2004-258139 and JP2004-62146 disclosed an LCD device in which each pixel is divided into two sub-pixels by two pixel electrodes and two storage capacitors. The first and the second operation voltages V1(gk) and V2(gk) are applied to each pixel. The difference between the voltages V1(gk) and V2(gk) is determined by a capacitance-coupling driving. Accordingly, JP2004-258139 and JP2004-62146 use the divided sub-pixels and the different operation voltages to improve the angular Gamma offset of partial gray-tone. FIGS. 11 to 13 are schematic graphs of Gamma curves, as shown in JP2004-258139 and JP2004-62146, where a Y-axis indicates a voltage V and transmittance T and an X-axis indicates a gray-tone transmittance. As shown in FIG. 11, the angular Gamma offset is improved on the low gray-tone as the pixel ratio of a first to a second sub-pixel is 30:70, where the first sub-pixel has 30% area of the pixel, and the second sub-pixel has 70% area of the pixel. As shown in FIG. 12, the angular Gamma offset is improved on the low gray-tone as the pixel ratio of a first to a second sub-pixel is 70:30, where the first sub-pixel has 70% area of the pixel, and the second sub-pixel has 30% area of the pixel. As shown in FIG. 13, the angular Gamma offset is improved on the low gray-tone as the pixel ratio of a first to a second sub-pixel is 50:50, where the first sub-pixel has 50% area of the pixel, and the second sub-pixel has 50% area of the pixel. However, in the above-mentioned Japan Patent Application Publications, the angular Gamma offset of all gray-tone still cannot be proved effectively. Therefore, the MVA LCD provided by the above-mentioned Japan Patent Application Publications still encounter the problem of the non-homogeneous distribution of the brightness. Therefore, it is desirable to provide an improved method to mitigate the aforementioned problems.

SUMMARY OF THE INVENTION

The present invention provides a circuit of a pixel of a multi-domain vertical alignment liquid crystal display (MVA LCD) device. The circuit of a pixel of a MVA LCD device can improve the narrow viewing angle of the conventional MVA LCD device. The related MVA LCD device that can improve the narrow viewing angle of the conventional MVA LCD device is also provided.

The present invention also provides a circuit of a pixel of a MVA LCD device, which can improve the distribution of the brightness of the conventional MVA LCD device. The related MVA LCD device that can improve the distribution of the brightness of the conventional MVA LCD device is also provided.

The circuit of the pixel of the MVA LCD device comprises a first sub-pixel unit and a second sub-pixel unit. The first sub-pixel unit comprises a first thin film transistor (TFT), a first liquid crystal capacitor, and a first storage capacitor. A source of the first thin film transistor is electrically connected to a data line. A gate of the first thin film transistor is electrically connected to a scan line. A drain of the first thin film transistor and one terminal of the liquid crystal capacitor are electrically connected to one terminal of the first storage capacitor. The second sub-pixel unit illustrated above comprises a second thin film transistor, a second liquid crystal capacitor, and a second storage capacitor. A source of the second thin film transistor is electrically connected to the data line. A gate of the second thin film transistor is electrically connected to the scan line. A drain of the second thin film transistor and one terminal of the second liquid crystal capacitor are electrically connected to one terminal of the second storage capacitor. Moreover, the other terminal of the first storage capacitor is electrically connected to a coupling signal line providing a coupling electrode signal. The other terminal of the second storage capacitor is electrically connected to a storage bus line providing a common voltage, so that the pixel voltage of the first sub-pixel unit is different from the pixel voltage of the second sub-pixel unit.

Another pixel circuit of a multi-domain vertical alignment liquid crystal display (MVA LCD) device of the present invention is also provided. The pixel circuit comprises a first sub-pixel unit, a second sub-pixel unit and a third sub-pixel unit. The first sub-pixel unit comprises a first storage capacitor with one end electrically connected to a first coupling signal line providing a first coupling electrode signal. The second sub-pixel unit comprises a second storage capacitor electrically connected to a storage bus line providing a common voltage. The third sub-pixel unit comprises a third storage capacitor electrically connected to a second coupling signal line providing a second coupling electrode signal. In addition, the first sub-pixel unit has a first pixel voltage, the second sub-pixel unit has a second pixel voltage, and the third sub-pixel unit has a third pixel voltage. The first pixel voltage couples the first coupling electrode signal, and the third pixel voltage couples the second coupling electrode signal.

The MVA LCD device of the present invention comprises a first substrate, and a second substrate. The first substrate comprises plural protrusions and a top electrode. The top electrode is located on the surface of the first substrate, and the protrusions are located on part of the surface of the top electrode. The second substrate illustrated above comprises a plural of pixels. Each pixel comprises a first sub-pixel unit, and a second sub-pixel unit. The first sub-pixel unit comprises a first thin film transistor, a first liquid crystal capacitor, and a first storage capacitor. A source of the first thin film transistor is electrically connected to a data line. A gate of the first thin film transistor is electrically connected to a scan line. A drain and one terminal of the liquid crystal capacitor are electrically connected to one terminal of the first storage capacitor. The second sub-pixel unit illustrated above comprises a second thin film transistor, a second liquid crystal capacitor, and a second storage capacitor. A source of the second thin film transistor is electrically connected to the data line. A gate of the second thin film transistor is electrically connected to the scan line. A drain of the second thin film transistor and one terminal of the second liquid crystal capacitor are electrically connected to one terminal of the second storage capacitor. Moreover, the other terminal of the first storage capacitor is electrically connected to a coupling signal line providing a coupling electrode signal. The other terminal of the second storage capacitor is electrically connected to a storage bus line providing a common voltage, so that the pixel voltage of the first sub-pixel unit is different from the pixel voltage of the second sub-pixel unit.

Another multi-domain vertical alignment liquid crystal display (MVA LCD) device of the present invention is also provided. The MVA LCD device comprises a first substrate and a second substrate. The first substrate comprises a top electrode and a plurality of protrusions. The top electrode is located on the first substrate. The protrusions are located on a partial surface of the top electrode. The second substrate comprises a plurality of pixel electrodes, a plurality of first coupling electrodes, a plurality of second coupling electrodes, a plurality of common electrodes, and a gate insulation layer. The first coupling electrodes, the second coupling electrodes and the common electrodes are located on a partial surface of the second substrate, and the gate insulation layer is located on the first coupling electrodes, the second coupling electrodes, the common electrodes and the remaining surface of the second substrate. The pixel electrodes are located on a partial surface of the gate insulation layer. The first and the second substrates form a plurality of pixel units for each having a first, a second and a third sub-pixel unit. The first sub-pixel unit comprises a first storage capacitor electrically connected to one of the first coupling electrodes. The second sub-pixel unit comprises a second storage capacitor electrically connected to one of the common electrodes. The third sub-pixel unit comprises a third storage capacitor electrically connected to one of the second coupling electrodes. In addition, each first coupling electrode provides a first coupling electrode signal, each second coupling electrode provides a second coupling electrode signal, and each common electrode provides a common voltage. A first pixel voltage of the first sub-pixel unit is coupled with the first coupling electrode signal, and a third pixel voltage of the third sub-pixel unit is coupled with the second coupling electrode signal. The first, the second and the third pixel voltages are different.

The coupling electrode signals applied on the coupling electrodes or coupling signal lines are not limited. Preferably, the coupling electrode signals are alternative current voltages. The material of the coupling signal lines can be any electrically conductive material. Preferably, the material of the coupling signal lines is the same with the material of the data line. The material of the scan line can be any electrically conductive material. Preferably, the material of the scan line is the same with the material of the top electrode. The difference between the pixel voltage of the first sub-pixel unit and the pixel voltage of the second sub-pixel unit is not limited. Preferably, the difference between the pixel voltage of the first sub-pixel unit and the pixel voltage of the second sub-pixel unit is in a range of 1-3 V. The arrangement of the first sub-pixel unit and the second sub-pixel unit is not limited. Preferably, the first sub-pixel unit is next to the second sub-pixel unit on a substrate, and the first sub-pixel unit and the second sub-pixel unit is arranged in a checkerboard manner. Moreover, the coupling electrode signals of the coupling signal lines can be identical or different. Preferably, the phase, or the magnitude of the voltage applied on the same coupling signal line in different time period is different.

The first sub-pixel unit further comprises a first thin-film transistor (TFT) and a first liquid crystal (LC) capacitor. The first TFT comprises a source electrically connected to a data line, a gate electrically connected to the scan line, and a drain electrically connected to one end of the first LC capacitor and the other end of the first storage capacitor.

The first and the second coupling signal lines, the storage bus line and a scan line are preferred to be made from the same material.

Preferably, the data line provides a data signal, and the first and the second coupling electrode signals have a one- to six-fold pulse width greater than than the data signal.

The second sub-pixel unit further comprises a second thin-film transistor (TFT) and a second liquid crystal (LC) capacitor. Preferably, the second TFT comprises a source electrically connected to the data line, a gate electrically connected to the scan line, and a drain electrically connected to one end of the second LC capacitor and the other end of the second storage capacitor.

The third sub-pixel unit further comprises a third thin-film transistor (TFT) and a third liquid crystal (LC) capacitor. The third TFT comprises a source electrically connected to the data line, a gate electrically connected to the scan line, and a drain electrically connected to one end of the third LC capacitor and the other end of the third storage capacitor.

Preferably, the first and the second coupling electrode signals are of an AC voltage, and the common voltage is a DC voltage. The first and the second coupling electrode signals are preferred to be phase-inverted.

Preferably, the first, the second and the third pixel voltages range from 0.5V to 2V.

Preferably, the first sub-pixel unit has an aperture ratio smaller than or equal to the third sub-pixel unit.

Preferably, the first substrate further comprises a color filter mounted between the first substrate and the top electrode.

Preferably, the second substrate further comprises a protection layer and a vertical alignment layer. The protection layer is optionally located over the gate insulation layer. The pixel electrodes are preferably located on a partial surface of the protection layer. The vertical alignment layer is preferably located over the pixel electrodes and the remaining surface of the protection layer.

Other objects, advantages, and novel features of the invention will become more apparent from the following detailed description when taken in conjunction with the accompanying drawings.

DETAILED DESCRIPTION OF THE PREFERRED EMBODIMENT

Embodiment 1

Figure 1:
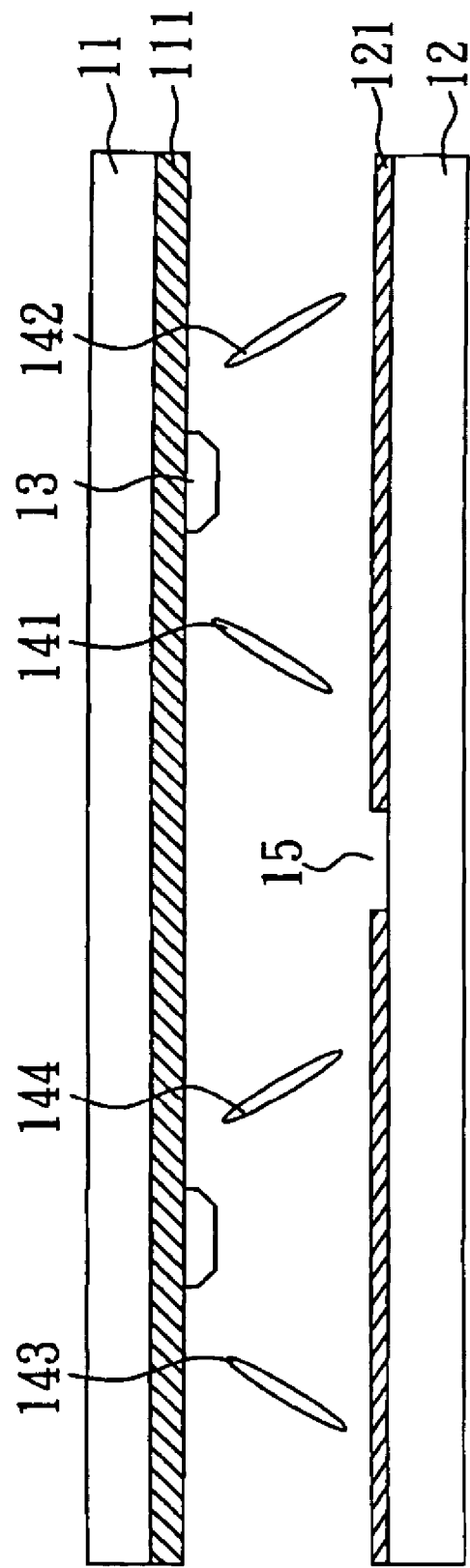
FIG. 1 is a schematic view of a conventional multi-domain vertical alignment liquid crystal display device.
Figure 2:
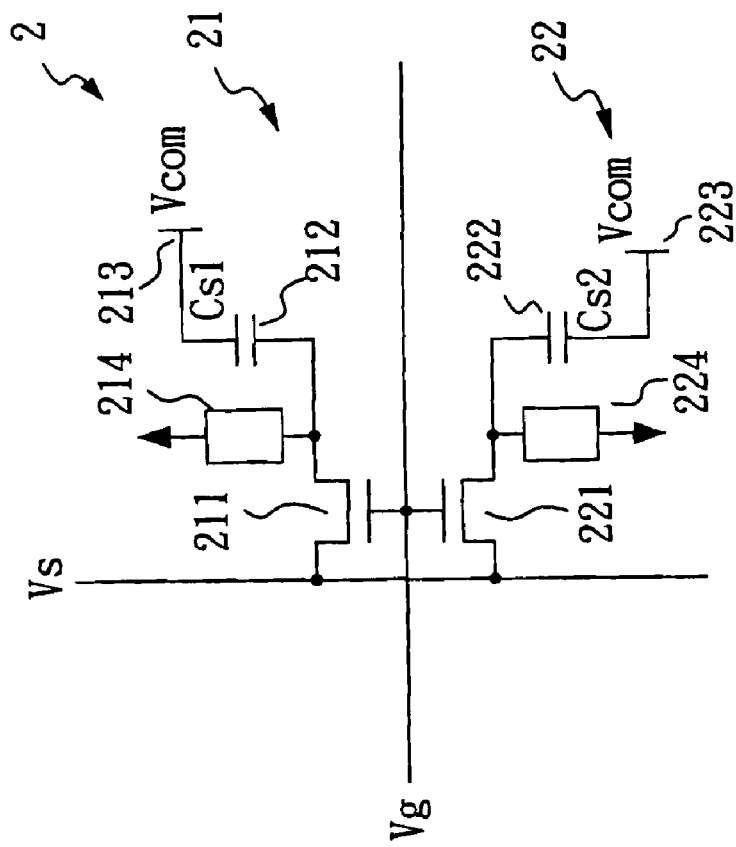
FIG. 2 is a schematic view of a pixel circuit of a conventional multi-domain vertical alignment liquid crystal display device.
Figure 3:
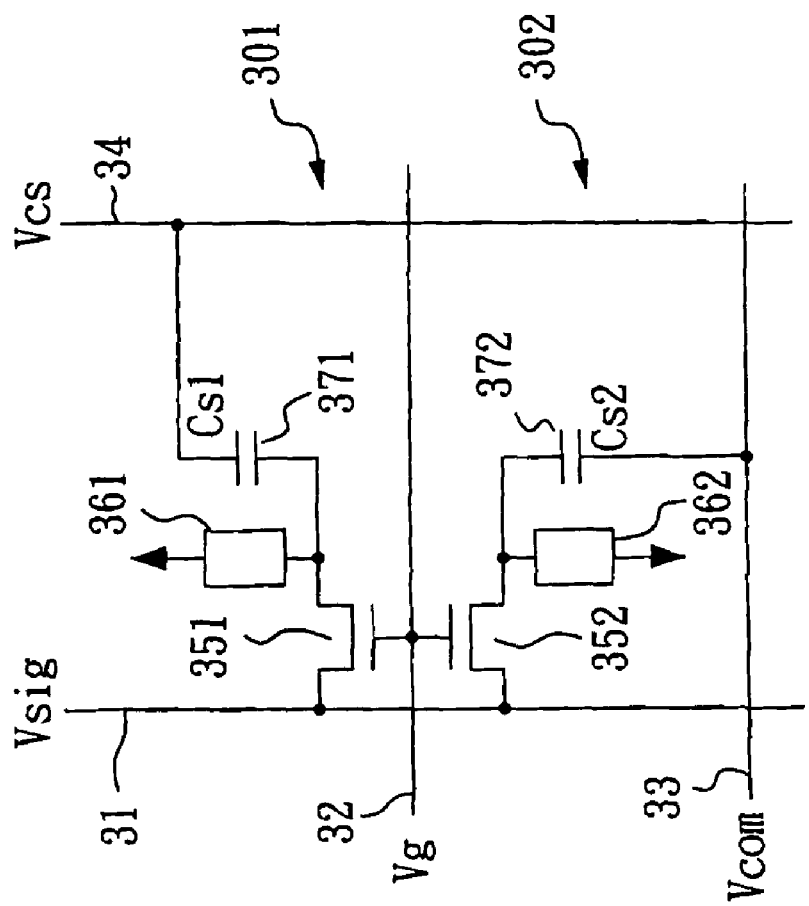
FIG. 3 is a schematic view of a pixel circuit of an embodiment of a multi-domain vertical alignment liquid crystal display device of the present invention.

FIG. 3 is a scheme of the circuit of a pixel 3 of the multi-domain vertical alignment liquid crystal display (MVA LCD) device of the present invention. The pixel 3 of the multi-domain vertical alignment liquid crystal display device of the present invention comprises sub-pixel units 301, 302, a data line 31, a scan line (Vg) 32, a storage bus line (Vcom) 33, a coupling signal line (Vcs2) 34, thin film transistors 351, 352, liquid crystal capacitors 361, 362, and storage capacitors 371, 372.

The sources of the thin film transistors 351, 352 are electrically connected to the data line 31. The gates of the transistors 351, 352 are electrically connected to the scan line 32. The drains of the transistors 351, 352 are electrically connected to the terminals of the liquid crystal capacitors 361, 362, and the terminals of the storage capacitors 371, 372. The other terminal of the storage capacitor 371 is electrically connected to the coupling signal line 34. On the other hand, the other terminal of the storage capacitor 372 is electrically connected to the common data line 33.

In the present embodiment of the present invention, the material of the coupling signal line 34 is the same with that of the data line 31. The material of the scan line 32 is identical to that of the storage bus line 33. In addition, the real coupling signal line 34 in the layout on the bottom substrate is a coupling electrode. On the other hand, the protrusion is located on the top substrate. Generally, the coupling electrode is arranged below the protrusion in the MVA LCD device of the present embodiment for improving the aperture ratio of the sub-pixel unit 301. The width of the coupling electrode of the MVA LCD device of the present embodiment is less than the width of the protrusion. The aperture ratio of the sub-pixel unit 301 is smaller than or equal to that of the other sub-pixel unit 302. In other words, the aperture ratio of the sub-pixel unit 301 is not greater than that of the sub-pixel unit 302.

The storage bus line 33 illustrated above is used to provide constant common voltage. The common voltage in the present embodiment is a direct current voltage. The coupling signal line 34 is used to provide coupling electrode signal, and the coupling electrode signal is an alternative current voltage. In the MVA LCD device of the present embodiment, the magnitude of the common voltage is different from that of the coupling electrode signal. Moreover, because the storage capacitor 371 is electrically connected to the coupling signal line 34, and the storage capacitor 372 is electrically connected to the storage bus line 33, the pixel voltage of the sub-pixel unit 301 is different from that of the sub-pixel unit 302.

The pixel voltages of the sub-pixel units 301, 302 can obtain through the following formula:

$$Vp1=(Cs1/(Cs1+Clc+Cgd))*Vcs(n)+Vsig$$

$$Vp2=Vsig$$

wherein Vp1 is the pixel voltage of the sub-pixel 301, Vp2 is the pixel voltage of the sub-pixel 302, Vsig is the operation voltage of the data line 31, Vcs(n) is the coupling electrode signal provided by the coupling signal line 31, Cs1 is the capacitance of the storage capacitor 371, Clc is the capacitance of the liquid crystal capacitor, and Cgd is the capacitance between the gate and the drain of the thin film transistor 351.

The magnitudes, or the phases of the coupling electrode signal (Vcs(n)) of the sub-pixel unit 301 for displaying different colors are different. In the MVA LCD device of the present embodiment, several voltages of different magnitudes and phases are used for the adjusting the gamma characteristics of colors such as red, green, and blue. These voltages are voltages of red (+), green (−), blue (+), red (−), green (+), and blue (−). In addition, the coupling electrode signal of the sub-pixel unit 301 for displaying blue is less than that for other original colors (e.g. red or green) in the MVA LCD device of the present embodiment.

Through controlling the coupling electrode signal of the coupling signal line, the pixel voltage of the sub-pixel unit 301 can be different from that of the sub-pixel unit 302. Hence, the average tilted angle of the liquid crystal molecules in sub-pixel unit 301 can be different from that of the sub-pixel unit 302 through controlling the coupling electrode signal of the coupling signal line.

In the present embodiment, the difference between the pixel voltage of the sub-pixel unit 301 and that of the sub-pixel unit 302 is preferably controlled in a range from 1V to 3V. Hence, the average tilted angle of the driven liquid crystal molecules in sub-pixel unit 301 is greater than that in sub-pixel unit 302.

Figure 4:
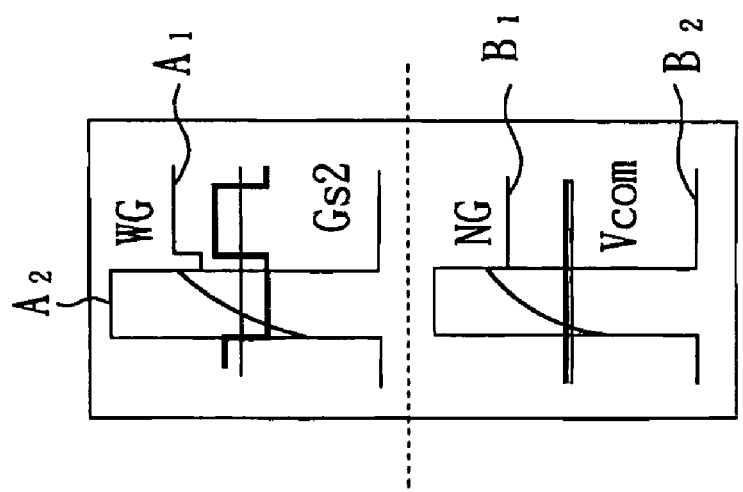
FIG. 4 is a scheme of a waveform of the voltage applied on the pixel of the multi-domain vertical alignment liquid crystal display device of the present invention.

FIG. 4 shows the waveforms of the electrode voltages. The related illustration needs to refer to FIG. 3, too. In FIG. 4, A1 is the waveform of the electrode voltage of the sub-pixel unit 301. A2 is the waveform of the source voltage provided by the data line 31. B1 is the waveform of the electrode voltage of the sub-pixel unit 302. B2 is the waveform of the source voltage provided by the data line 31.

The pixel voltage of the sub-pixel unit (e.g. the pixel voltage of the sub-pixel unit 301) of a pixel is charged by the data line 31, and is increased by the coupling electrode signal from the coupled storage capacitor 371 (as shown by A1). On the contrast, the pixel voltage of the other sub-pixel unit (e.g. the sub-pixel unit 302) of the same pixel is charged by the source voltage of the data line 31 without increasing since the sub-pixel unit 302 is electrically connected to the storage capacitor 372 and the storage bus line 33.

Hence, the pixel voltage of the sub-pixel unit 301 can be different from that of the sub-pixel unit 302 through connecting the coupling signal line 34 and the storage capacitor 371.

The arrangement for achieving the circuit on the real bottom substrate of the MVA LCD device is illustrated in the following paragraphs.

Figure 5:
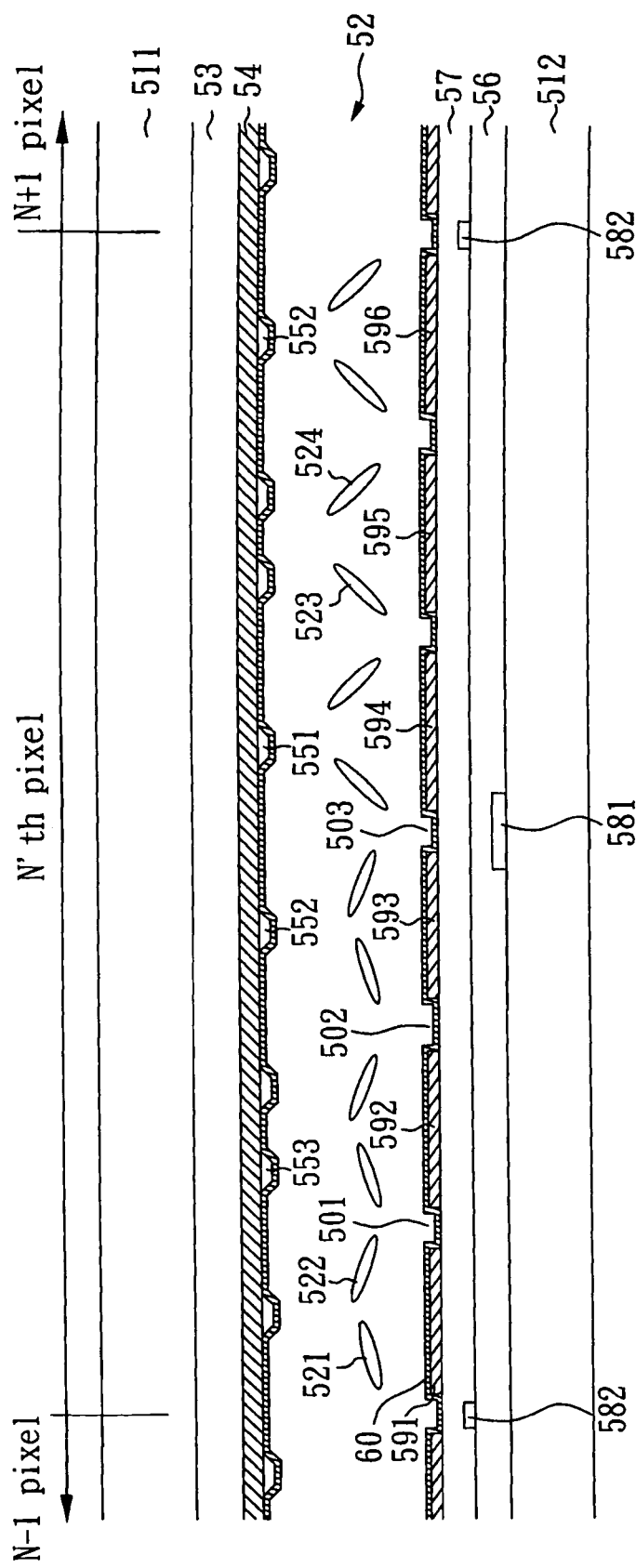
FIG. 5 is a cross section view of a pixel of an embodiment of the multi-domain vertical alignment liquid crystal display device of the present invention.

FIG. 5 is a cross section view of the MVA LCD device of the present invention. As shown in FIG. 5, the top substrate 511, the negative liquid crystal layer 52, and the bottom substrate 512 are comprised in the MVA LCD device of the present invention. The negative liquid crystal layer comprises plural liquid crystal molecules 521, 522, 523, 524 having negative dielectric constant.

Furthermore, a layer of a color filter 53 is formed on the surface of the top substrate 511. On the surface of the color filter 53, a top electrode 54 is formed. Several protrusions 551, 552, 553 are formed on part of the surface of the top electrode 54.

On the contrary, a gate insulation layer 56 forms on the bottom substrate 512. A passivation layer 57 is formed on the surface of the gate insulation layer 56. Between the gate insulation layer 56 and the bottom substrate, a common electrode 581 is formed. The common electrode is used to connect a second storage capacitor 372 (also see FIG. 3). On the other hand, a coupling electrode 582 is arranged between the gate insulation layer 56 and the passivation layer 57. The coupled electrode 581 is used to connect the first storage capacitor 371 (see FIG. 3).

Several pixel electrodes 591, 592, 593, 594, 595, 596 are arranged on the passivation layer 57. The pixel electrodes 591, 592, 593, 594, 595, 596, and the passivation layer 57 are covered by a vertical alignment layer 60. Moreover, several slits 501, 502, 503 are located between the pixel electrodes 591, 592, 593, 594, 595, 596. Since one of the storage capacitor of a sub-pixel unit is electrically connected to the coupling signal line (i.e. the coupling electrode 582) providing coupling electrode signal, and the other storage capacitor of the other sub-pixel unit electrically connected to the storage bus line providing common voltage, the pixel voltages of the two sub-pixel units of the same pixel are different. Hence, the average tilted angles of these two sub-pixel unit s of the same pixel are different, either. The distribution of the brightness of a MVA LCD device can therefore be improved.

Figure 6:
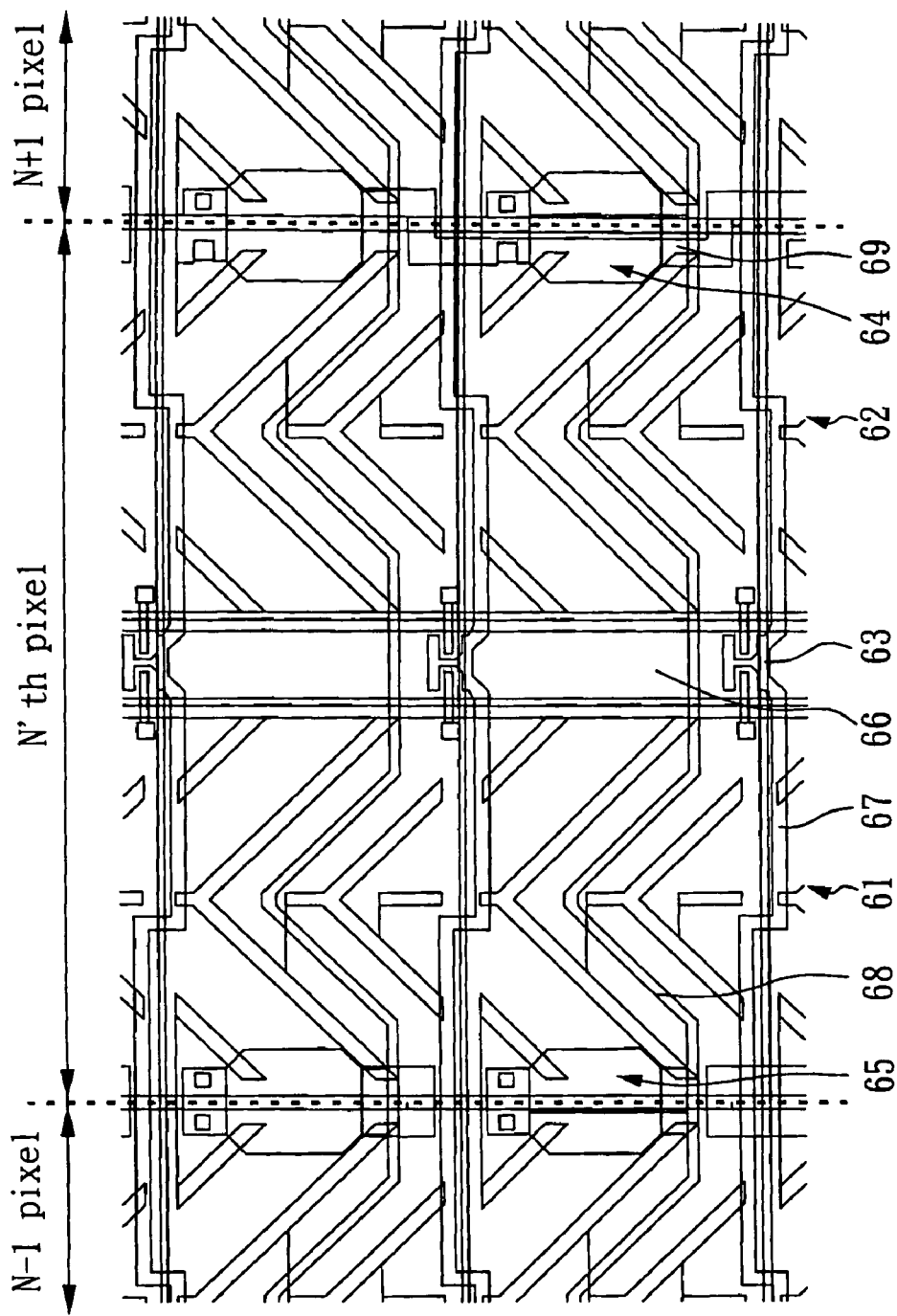
FIG. 6 is a schematic view of the layout of the pixel circuit of an embodiment of the multi-domain vertical alignment liquid crystal display device of the present invention.

FIG. 6 shows one embodiment of the layout of the circuit of the present invention. The pixel comprises a sub-pixel unit 61, a sub-pixel unit 62, a thin film transistor 63, a coupling electrode 64 for electrically connecting the storage capacitor (Cs1), a common electrode 65 for electrically connecting the storage capacitor (Cs2), a gate line (i.e. scan line) 66, a data line 67, a coupling signal line 68, and a common electrode 69.

The sub-pixel unit 61, the sub-pixel unit 62, the thin film transistor 63, the coupling electrode 64 for electrically connecting the storage capacitor (Cs1), the common electrode 65 for electrically connecting the storage capacitor (Cs2), the gate line (i.e. scan line) 66, the data line 67, the coupling signal line 68, and the common electrode 69 are arranged on the bottom substrate 512 (shown in FIG. 5). Moreover, the sub-pixel units 61, 62 are arranged in an order or shape of a checkerboard.

The coupling signal line 68 is electrically connected to the coupling electrode 64. The common electrode 69 is electrically connected to the common electrode 65. The coupling electrode 63 and the common electrode 65 are parallel to the gate line 66.

Figure 8:
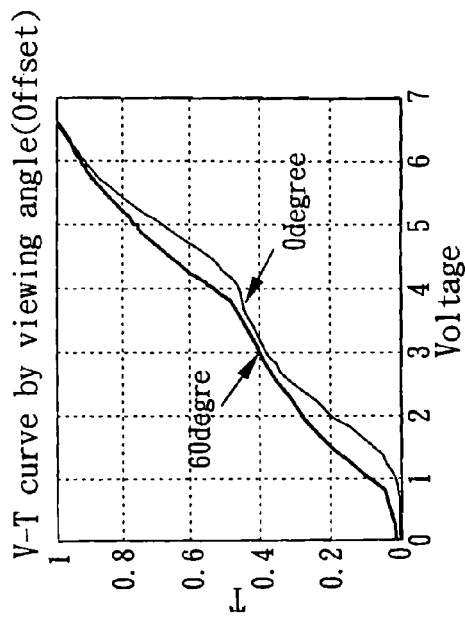
FIG. 8 is the V-T curve of the multi-domain vertical alignment liquid crystal display device of the present invention.
Figure 10:
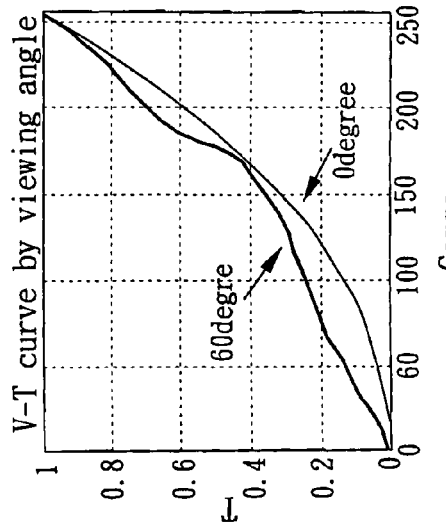
FIG. 10 is the gamma characteristics of the multi-domain vertical alignment liquid crystal display device of the present invention.
Figure 7:
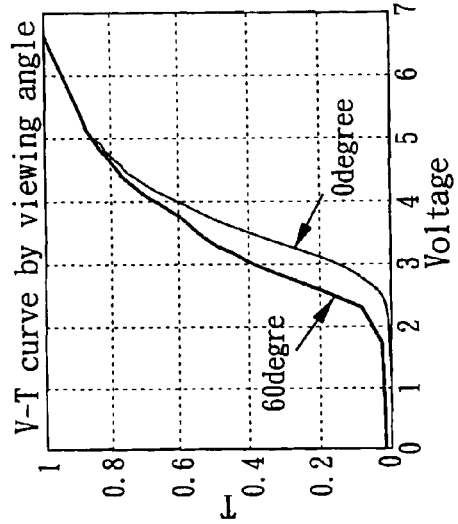
FIG. 7 is the V-T curve of the conventional multi-domain vertical alignment liquid crystal display device.
Figure 9:
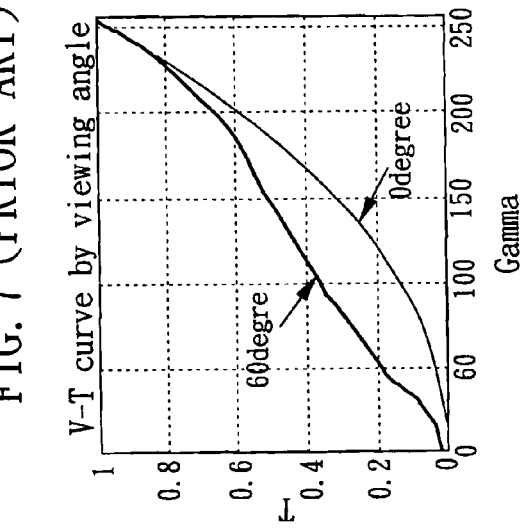
FIG. 9 is the gamma characteristics of conventional multi-domain vertical alignment liquid crystal display device.
Figure 11:
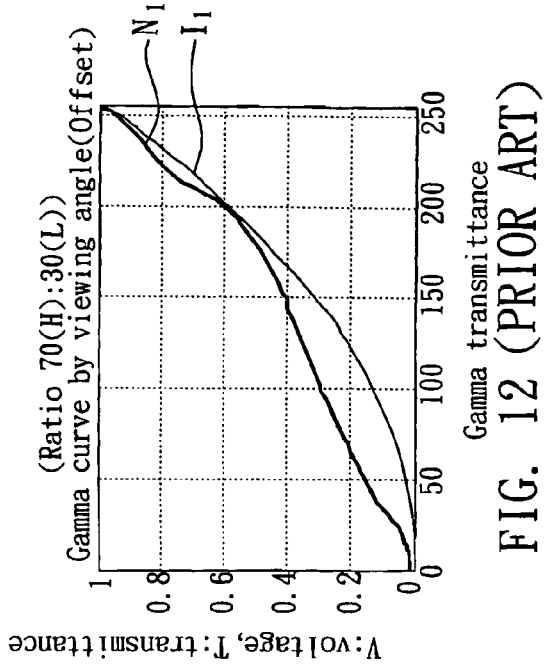
FIG. 11 is a graph of an embodiment of Gamma curves of a conventional typical LCD.
Figure 12:
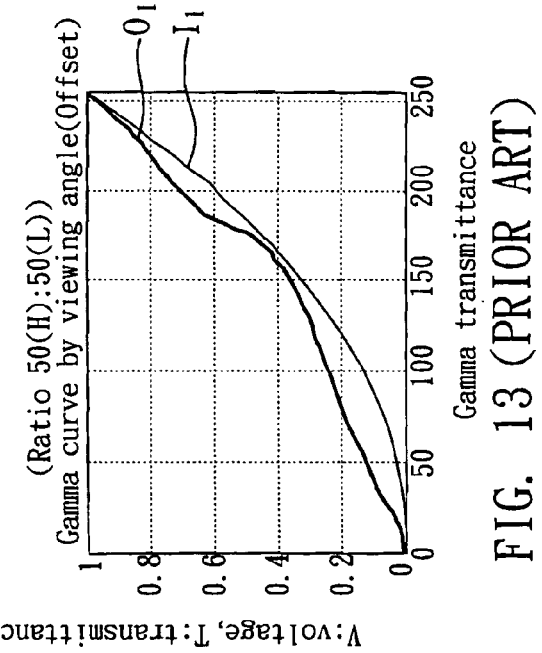
FIG. 12 is a graph of another embodiment of Gamma curves of a conventional typical LCD.
Figure 13:
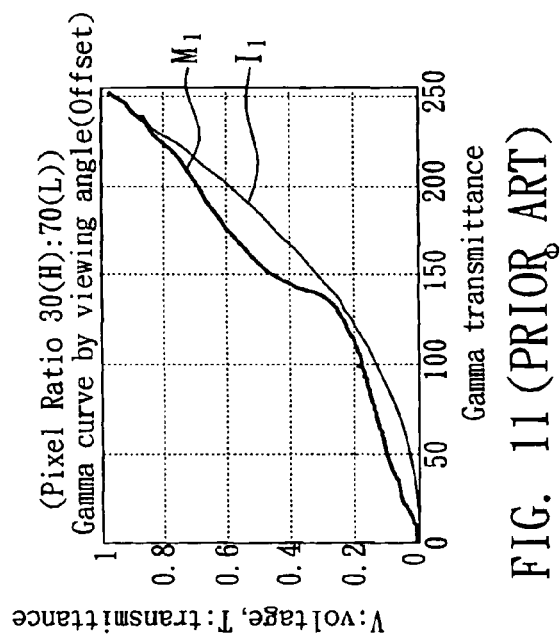
FIG. 13 is a graph of a further embodiment of Gamma curves of a conventional typical LCD.

FIG. 7 to FIG. 10 are the V-T curve or gamma characteristics of the MVA LCD device of the present invention and the V-T curve of the conventional MVA LCD device. FIG. 7 is the V-T curve of the conventional MVA LCD device. FIG. 8 is the V-T curve of the MVA LCD device of the present invention. The voltage applied on the storage capacitor of the MVA LCD device of the present invention is positive/negative 1.5V. By comparing the V-T curve in FIG. 7 and that in FIG. 8, it is easy to know that the circuit of the pixel the present invention can actually improve the disadvantage of the conventional MVA LCD device. FIG. 9 is the gamma characteristics of conventional MVA LCD device. FIG. 10 is the gamma characteristics of the MVA LCD device of the present invention. The voltage applied on the storage capacitor of the MVA LCD device of the present invention is positive/negative 1.5V. By comparing the gamma characteristics in FIG. 9 and that in FIG. 10, it is easy to know that the circuit of the pixel the present invention can actually improve the disadvantage of the conventional MVA LCD device.

According to the description illustrated above, through connecting the coupling signal line to the first storage capacitor of the first sub-pixel unit of a pixel, the pixel voltage of the first sub-pixel unit can be different from the pixel voltage of the second sub-pixel unit whose second storage capacitor is electrically connected to the storage bus line having common voltage. Therefore, the average tilted angle of the first sub-pixel unit is different from that of the second sub-pixel unit. Hence, the distribution of the brightness for various viewing angle can be improved through the circuit of the pixel of the MVA LCD device of the present invention.

Embodiment 2

Figure 14:
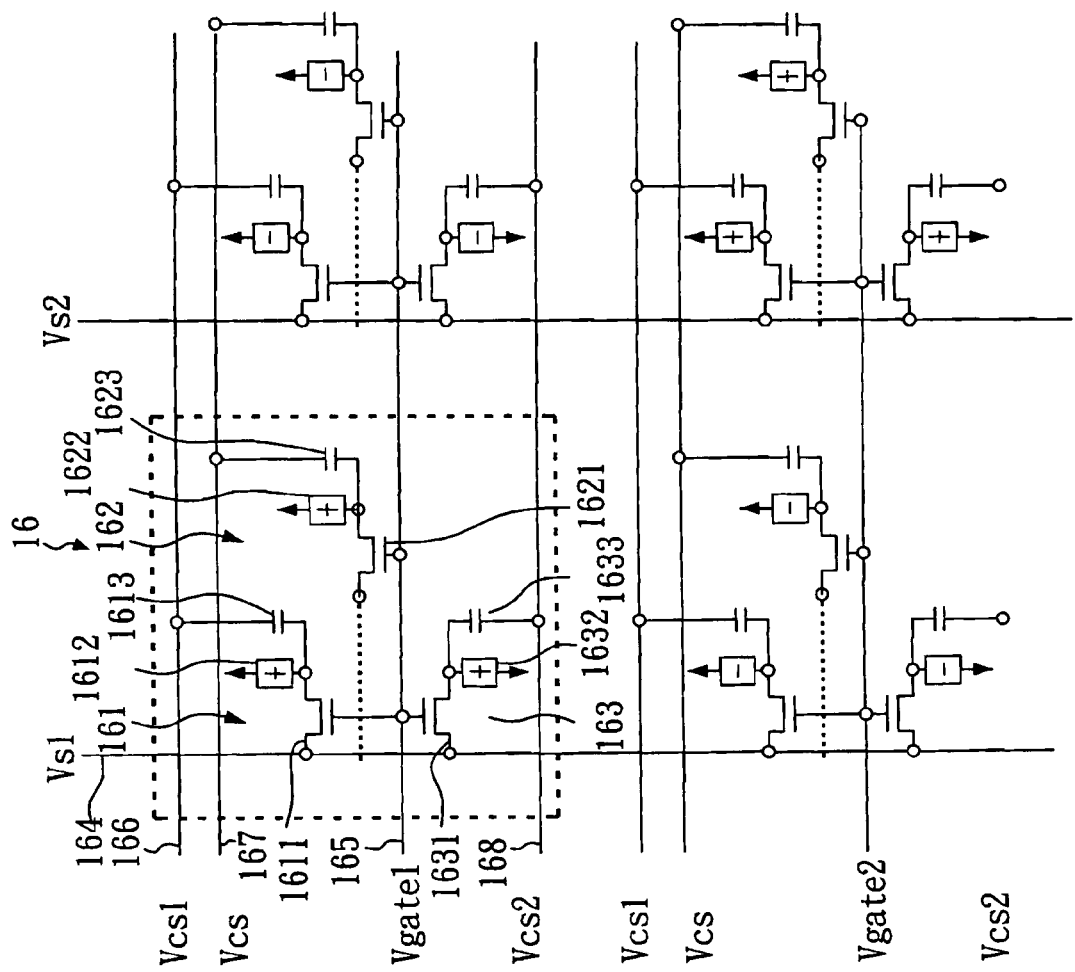
FIG. 14 is a schematic diagram of pixel circuits according to a preferred embodiment of the invention.

FIG. 14 is a schematic diagram of pixel circuits according to a preferred embodiment of the invention. In FIG. 14, a single pixel circuit 16 comprises sub-pixel units 161 to 163, a data line 164, a scan line (Vg) 165, a first coupling signal line (Vcs1) 166, a storage bus line 167 and a second coupling signal line (Vcs2) 168. The sub-pixel unit 161 comprises a TFT 1611, an LC capacitor 1612 and a storage capacitor 1613. The sub-pixel unit 162 comprises a TFT 1621, an LC capacitor 1622 and a storage capacitor 1623. The sub-pixel unit 163 comprises a TFT 1631, an LC capacitor 1632 and a storage capacitor 1633.

The data line 164 is electrically connected to the respective sources of the TFTs 1611, 1621, 1631. The scan line 165 is electrically connected to the respective gates of the TFTs 1611, 1621, 1631. In addition, the TFT 1611 comprises a drain electrically connected to one end of the LC capacitor 1612 and one end of the first storage capacitor 1613. The TFT 1621 comprises a drain electrically connected to one end of the LC capacitor 1622 and one end of the second storage capacitor 1623. The TFT 1631 comprises a drain electrically connected to one end of the LC capacitor 1632 and one end of the third storage capacitor 1633. The other end of the storage capacitor 1613 is electrically connected to the first coupling signal line 166. The other end of the second storage capacitor 1623 is electrically connected to the storage bus line 167. The other end of the third storage capacitor 1633 is electrically connected to the second coupling signal line 168.

In this embodiment, the first coupling signal line 166, the storage bus line 167, the second coupling signal line 168 and the scan line 165 are made from the same material. In this embodiment, the first coupling signal line provides a first coupling electrode signal, and the second coupling signal line provides a second coupling electrode signal. In addition, the first and the second coupling electrode signals are an AC signal but phase-inverted, and have a one- to six-fold signal width greater than the data line 164. The second coupling signal line 168 provides a common voltage signal, which is a DC signal.

The first and the second coupling electrode signals have a first and a second voltage level. For example, in this embodiment, the first voltage level is a low voltage level, and the second voltage level is a high voltage level. However, in other examples, the first voltage level can be a high voltage level, and the second voltage level can be a low voltage level. Namely, since the first and the second coupling electrode signals are phase-inverted, the first coupling electrode signal is at the high voltage level, and the second coupling electrode signal is at the low voltage level.

As cited, the first coupling signal line 166 and the first storage capacitor 1613 are electrically connected, the storage bus line 167 and the second storage capacitor 1623 are electrically connected, and the second coupling signal line 168 and the third storage capacitor 1633 are electrically connected. In addition, the voltages provided by the first coupling signal line 166 to the sub-pixel unit 161, by the storage bus line 167 to the sub-pixel unit 162, and by the second coupling signal line 168 to the sub-pixel unit 163 are different. Thus, the respective pixel voltages Vp1 to Vp3 of the sub-pixel units 161 to 163 are different, which can be obtained respectively by the following equations.

$$Vp1=(Cs1/(Cs1+Clc1+Cgd1))*Vcs1+Vsig,$$

$$Vp2=Vsig,$$

$$Vp3=(Cs3/(Cs3+Clc3+Cgd3))*Vcs3-Vsig,$$

wherein Vp1 is a pixel voltage of the sub-pixel unit 161, Vp2 is a pixel voltage of the sub-pixel unit 162, Vp3 is a pixel voltage of the sub-pixel unit 163, Vsig is an operation voltage provided by the data line 164, Vcs1 is a voltage level of the first coupling electrode signal provided by the first coupling signal line 166, Vcs3 is a voltage level of the second coupling electrode signal provided by the second coupling signal line 168, Cs1 is a capacitance of the first storage capacitor 1613, Clc1 is a capacitance of the LC capacitor 1612, Cgd1 is a gate-drain capacitance of the TFT 1611, Cs3 is a capacitance of the third storage capacitor 1633, Clc3 is a capacitance of the LC capacitor 1632, and Cgd3 is a gate-drain capacitance of the TFT 1631.

In this embodiment, since the different voltages Vp1 to Vp3 are applied to the sub-pixel units 161 to 163 respectively, the respective LCs of the sub-pixel units have a different inclination. Namely, the inclination of the LCs of the sub-pixel unit 61 is different from that of the sub-pixel unit 162, and also the inclination of the LCs of the sub-pixel unit 162 is different from that of the sub-pixel unit 163. Accordingly, the phase retardation produced by the sub-pixel unit 161, 162 or 163 can be compensated by the phase retardation produced by the remaining two sub-pixel units to thereby improve all gray-tone viewing angles and corresponding Gamma characteristics of the display panel. In this embodiment, each sub-pixel unit 161, 162 or 163 preferably has a pixel voltage ranging from 0.5V to 2V.

Figure 15:
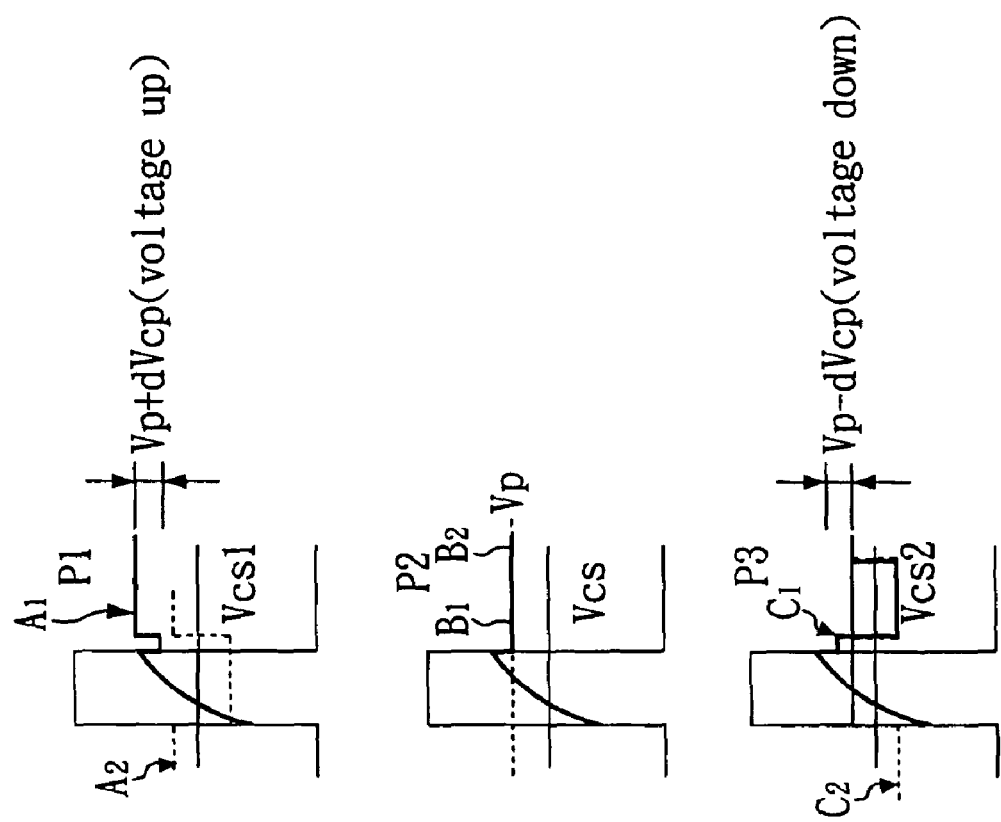
FIG. 15 is a schematic diagram of pixel voltage waveforms of a single pixel unit according to a preferred embodiment of the invention.

FIG. 15 is a schematic diagram of pixel voltage waveforms P1 to P3 of a single pixel unit according to a preferred embodiment of the invention. As shown in FIGS. 6b and 7b, notation A1 indicates a waveform of the pixel voltage of the sub-pixel unit 161, notation A2 indicates a waveform of the first coupling electrode signal provided by the first coupling signal line 166, notation B1 indicates a waveform of the pixel voltage of the sub-pixel unit 162, notation B2 indicates a voltage level of the common voltage provided by the storage bus line 167, notation C1 indicates a waveform of the pixel voltage of the sub-pixel unit 163, and notation C2 indicates a waveform of the second coupling electrode signal provided by the second coupling signal line 168.

The pixel voltage of the sub-pixel unit 161 typically drops even when the sub-pixel unit 161 is charged originally to a level of the pixel voltage equal to the voltage level of a data signal provided by the data line 164. To overcome this, the first coupling electrode signal provided by the first coupling signal line 166 is applied to increase the pixel voltage of the sub-pixel unit 161 close to the voltage level provided by the data line 164, as shown by A1.

The pixel voltage of the sub-pixel unit 162 typically drops even when the sub-pixel unit 162 is charged originally to a level of the pixel voltage equal to the voltage level of a data signal provided by the data line 164, and the reduced pixel voltage of the sub-pixel unit 162 is almost equal to a level of the common voltage provided by the storage bus line 167, as shown by B1. Accordingly, the pixel voltages of the sub-pixel units 161 and 162 are different.

The pixel voltage of the sub-pixel unit 163 typically drops even the sub-pixel unit 163 is charged originally to a level of the pixel voltage equal to the voltage level of a data signal provided by the data line 164. Accordingly, the second coupling electrode signal provided by the second coupling signal line 168 is applied to further reduce the pixel voltage of the sub-pixel unit 163, as shown by C1. Consequently, the respective pixel voltages of the sub-pixel units 161 to 163 are different.

Further, the pixel circuit cited above is formed as follows.

Figure 16:
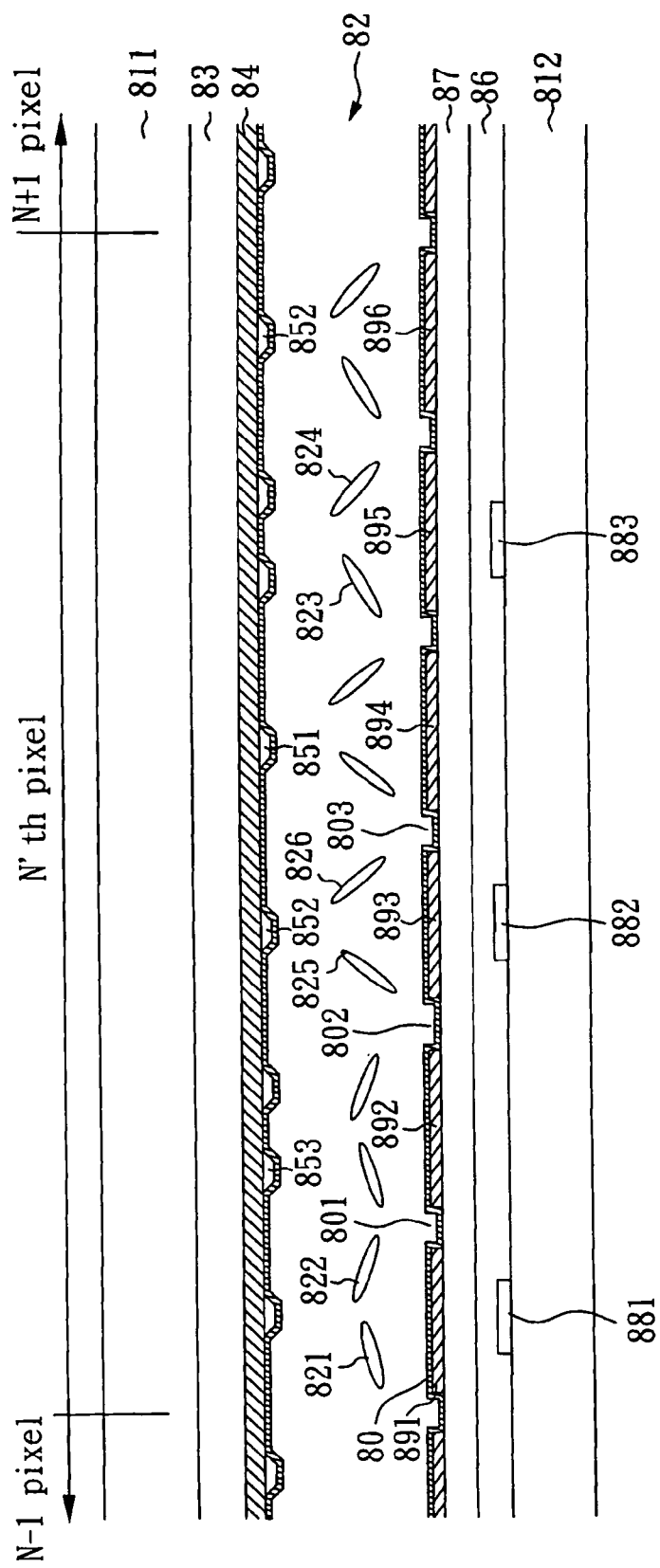
FIG. 16 is a cross-sectional view of a multi-domain vertical alignment liquid crystal display (MVA LCD) device according to a preferred embodiment of the invention.

FIG. 16 is a cross-sectional view of a MVA LCD device according to a preferred embodiment of the invention. In FIG. 16, for clear description, only the Nth pixel structure is shown. The Nth pixel structure of the MVA LCD device comprises substrates 811 and 812, and a negative LC layer 82 mounted between the substrates 811 and 812. The negative LC layer 82 comprises a plurality of out-of-phase LCs 821 to 826 with a negative dielectric constant.

A color filter layer 83 is located between the first substrate 811 and a top electrode 84, and a plurality of protrusions 851 to 853 are formed on a partial surface of the top electrode 84.

A gate insulation layer 86 is located on the second substrate 812. A protection layer 87 is located over the gate insulation layer 86. A first coupling electrode 881, a common electrode 882 and a second coupling electrode 883 are formed on a partial surface of the second substrate 812. In addition, as cited above, the first coupling electrode 881 and the storage capacitor 1613 are electrically connected. The common electrode 882 and the storage capacitor 1623 are electrically connected. The second coupling electrode 883 and the storage capacitor 1633 are electrically connected. The first coupling electrode 881 provides the first coupling electrode signal. The common electrode 882 provides the common voltage. The second coupling electrode 883 provides the second coupling electrode signal. Namely, the first coupling electrode 881, common electrode 882 and second coupling electrode 883 are formed as the respective first coupling signal line 166, storage bus line 167 and second coupling signal line 168 of FIG. 14.

As cited above, the cross section of the first coupling electrode, common electrode and second coupling electrode of a single pixel of FIG. 16 is shown for description only. The respective first coupling electrodes, common electrodes and second coupling electrodes of multi-domain pixels are formed on the partial surface of the second substrate 812.

A plurality of pixel electrodes 891 to 896 are formed on a partial surface of the protection layer 87, with a plurality slits 801 to 803 therebetween. A vertical alignment layer is located over the pixel electrodes 891 to 896 and the remaining surface of the protection layer 87.

Figure 17:
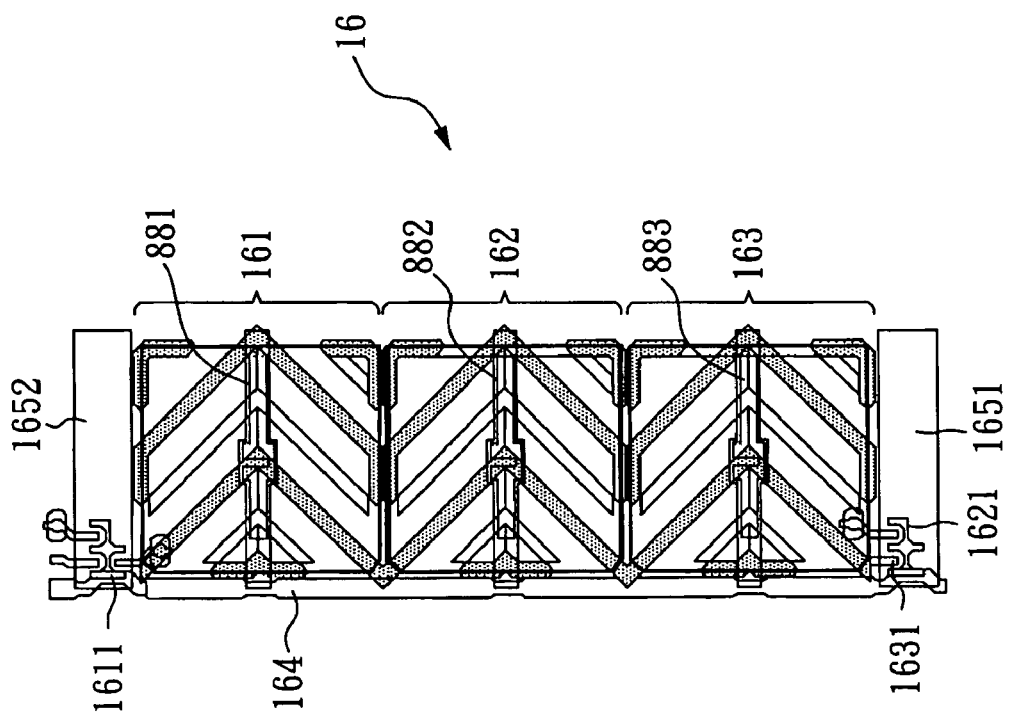
FIG. 17 is a view of a pixel circuit layout of a multi-domain vertical alignment liquid crystal display (MVA LCD) device according to a preferred embodiment of the invention.

In a pixel 16, referring to FIG. 17, the first sub-pixel unit 161 has an aperture ratio smaller than or equal to the third sub-pixel unit 163. The storage capacitor 1613 of the first sub-pixel unit 161 is electrically connected to the first coupling signal line 166 formed of the first coupling electrode 881. The storage capacitor 1623 of the second sub-pixel unit 162 is electrically connected to the storage bus line 167 formed of the common electrode 882. The storage capacitor 1633 of the third sub-pixel unit 163 is electrically connected to the second coupling signal line 168 formed of the second coupling electrode 883. Accordingly, the first and the second coupling signal lines 166 and 168 can provide the out-of-phase coupling electrode signals to the storage capacitors 1613 and 1633 while the pixel voltage of the second sub-pixel unit 162 is maintained. Therefore, the pixel voltages of the sub-pixel units 161 to 163 are different, and the LCs 821, 822 of the first sub-pixel unit 161, the LCs 825, 826 of the second sub-pixel unit 162 and the LCs 823, 824 of the third sub-pixel unit 163 have a different inclination to thereby improve the non-uniform brightness of the MVA LCD device.

FIG. 17 is a layout view of the pixel unit 16 of the MVA LCD device according to a preferred embodiment of the invention. In FIG. 17, the pixel unit 16 comprises the sub-pixel units 161 to 163, the TFTs 1611, 1621, 1631, the first coupling electrode 881, the common electrode 882, the second coupling electrode 883, the scan lines (gate bus wires) 1651, 1652 and the data line 164.

As shown in FIG. 17, the sub-pixel units 161 to 163, the TFTs 1611, 1621, 1631, the first coupling electrode 881, the common electrode 882, the second coupling electrode 883, the scan lines 1651, 1652, and the data line 164 are arranged on the second substrate 812 of FIG. 16, and the first coupling electrode 881 is parallel to the scan lines 1651, 1652.

Figure 19:
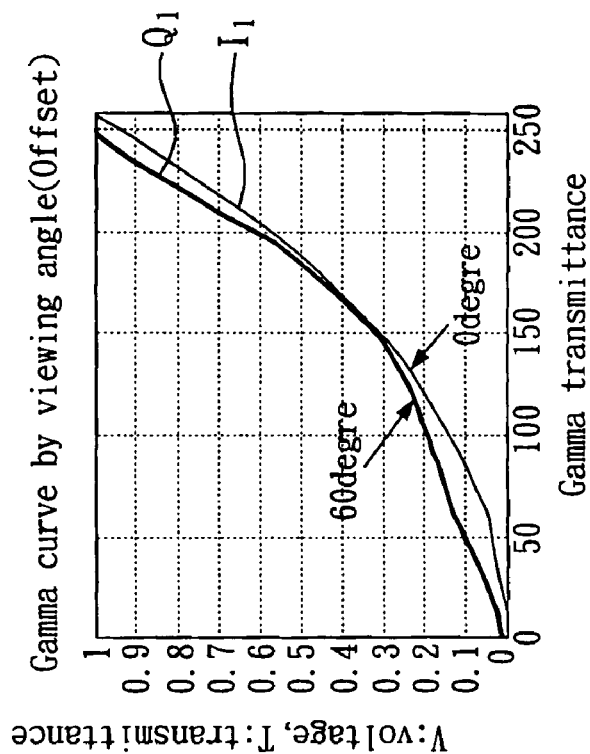
FIG. 19 is a graph of a hue curve of a MVA LCD device according to a preferred embodiment of the invention.
Figure 18:
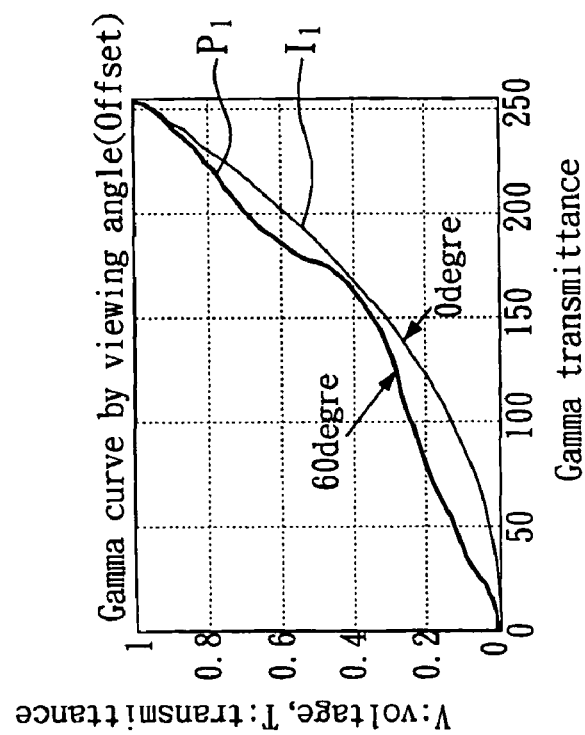
FIG. 18 is a graph of a hue curve of a conventional typical MVA LCD device.

FIG. 18 is a graph of a hue curve of a conventional MVA LCD device. FIG. 19 is a graph of a hue curve of a MVA LCD device according to a embodiment of the invention. In FIGS. 18 and 19, the Y-axis indicates the voltage V and transmittance T, and the X-axis indicates the gray-tone transmittance. By comparison of the hue curves of FIGS. 18 and 19 with the ideal hue curve, it is known that in FIG. 18 the hue curve P1 at the 60-degree viewing angle for the typical MVA LCD (in which, for example, each pixel unit is not divided into a plurality of sub-pixel units) is not a smooth curve and also is far from the ideal hue curve I1. In FIG. 19, the hue curve Q1 at the 60-degree viewing angle, even at other viewing angles, for the inventive MVA LCD is very close to the ideal hue curve I1.

Further, the invention can be applied to a TN panel module (TN LCDs) for providing the function of multi-domain compensation. As cited, the invention divides each pixel unit into three sub-pixel units. The storage capacitor of the first sub-pixel unit is electrically connected to the first coupling signal line providing the first coupling electrode signal. The storage capacitor of the second sub-pixel unit is electrically connected to the storage bus line providing the common voltage. The storage capacitor of the third sub-pixel unit is electrically connected to the second coupling signal line providing the second coupling electrode signal. Accordingly, the three sub-pixel units can have different pixel voltages by controlling the voltage levels and signal phases of the first and second coupling electrode signals and using the common voltage to maintain the pixel voltage of the second sub-pixel unit, and further the respective LCs of the sub-pixel units have different inclination to thereby improve the brightness non-uniformity at various viewing angles.

Although the present invention has been explained in relation to its preferred embodiment, it is to be understood that many other possible modifications and variations can be made without departing from the spirit and scope of the invention as hereinafter claimed.

What is claimed is:

1. A pixel circuit of a multi-domain vertical alignment liquid crystal display (MVA LCD) device, comprising:
   a first sub-pixel unit, which comprises a first storage capacitor with one end electrically connected to a first coupling signal line providing a first coupling electrode signal, a first liquid crystal (LC) capacitor and a first thin-film transistor (TFT) having a source electrically connected to a data line, a gate electrically connected to a scan line, and a drain electrically connected to one end of the first LC capacitor and the other end of the first storage capacitor;
   a second sub-pixel unit, which comprises a second storage capacitor electrically connected to a storage bus line providing a common voltage, a second liquid crystal (LC) capacitor and a second thin-film transistor (TFT) having a source electrically connected to the data line, a gate electrically connected to the scan line, and a drain electrically connected to one end of the second LC capacitor and the other end of the second storage capacitor; and
   a third sub-pixel unit, which comprises a third storage capacitor electrically connected to a second coupling signal line providing a second coupling electrode signal, a third liquid crystal (LC) capacitor and a third thin-film transistor (TFT) having a source electrically connected to the data line, a gate electrically connected to the scan line, and a drain electrically connected to one end of the third LC capacitor and the other end of the third storage capacitor;
   wherein the first sub-pixel unit has a first pixel voltage, the second sub-pixel unit has a second pixel voltage, and the third sub-pixel unit has a third pixel voltage, and wherein the first pixel voltage is coupled with the voltage level of the first coupling electrode signal and the third pixel voltage is coupled with the voltage level of the second coupling electrode signal.

2. The pixel circuit as claimed in claim 1, wherein the first and the second coupling signal lines, the storage bus line and a scan line are made from the same material.

3. The pixel circuit as claimed in claim 2, wherein the data line provides a data signal, and the first and the second coupling electrode signals have a one-to six-fold pulse width greater than the data signal.

4. The pixel circuit as claimed in claim 1, wherein the first and the second coupling electrode signals are of an AC voltage, and the common voltage is a DC voltage.

5. The pixel circuit as claimed in claim 1, wherein the range of the first, the second and the third sub-pixel voltages is from 0.5V to 2V.

6. The pixel circuit as claimed in claim 1, wherein the first and the second coupling electrode signals are phase-inverted.

7. The pixel circuit as claimed in claim 1, wherein the first sub-pixel unit has an aperture ratio equal to the third sub-pixel unit.

8. The pixel circuit as claimed in claim 1, wherein the first sub-pixel unit has an aperture ratio smaller than the third sub-pixel unit.

9. The pixel circuit as claimed in claim 1, wherein the first, the second and the third sub-pixels voltages are different.

10. A multi-domain vertical alignment liquid crystal display (MVA LCD) device, comprising:
    a first substrate, which comprises a top electrode located on the first substrate and a plurality of protrusions located on parts of the surface of the top electrode; and
    a second substrate, which comprises a plurality of pixel electrodes, a plurality of first coupling electrodes, a plurality of second coupling electrodes, a plurality of common electrodes and a gate insulation layer, wherein the first coupling electrodes, the second coupling electrodes and the common electrodes are located on parts of the surface of the second substrate, the gate insulation layer is located on the first coupling electrodes, the second coupling electrodes, the common electrodes and the remaining surface of the second substrate, and the pixel electrodes are located on parts of the surface of the gate insulation layer;
    wherein the first and the second substrates form a plurality of pixel units each having:
       a first sub-pixel unit, which comprises a first storage capacitor electrically connected to one of the first coupling electrodes, a first liquid crystal (LC) capacitor and a first thin-film transistor (TFT) having a source electrically connected to a data line, a gate electrically connected to a scan line, and a drain electrically connected to one end of the first LC capacitor and the other end of the first storage capacitor,
       a second sub-pixel unit, which comprises a second storage capacitor electrically connected to one of the common electrodes, a second liquid crystal (LC) capacitor and a second thin-film transistor (TFT) having a source electrically connected to the data line, a gate electrically connected to the scan line, and a drain electrically connected to one end of the second LC capacitor and the other end of the second storage capacitor, and
       a third sub-pixel unit, which comprises a third storage capacitor electrically connected to one of the second coupling electrodes, a third liquid crystal (LC) capacitor and a third thin-film transistor (TFT) having a source electrically connected to the data line, a gate electrically connected to the scan line, and a drain electrically connected to one end of the third LC capacitor and the other end of the third storage capacitor; and
    wherein each first coupling electrode provides a first coupling electrode signal, each second coupling electrode provides a second coupling electrode signal, each common electrode provides a common voltage, a first pixel voltage of the first sub-pixel unit is coupled with the voltage level of the first coupling electrode signal, and a third pixel voltage of the third sub-pixel unit is coupled with the voltage level of the second coupling electrode signal.

11. The MVA LCD device as claimed in claim 10, wherein the first and the second coupling electrode signals are of an AC voltage, and the common voltage is a DC voltage.

12. The MVA LCD device as claimed in claim 10, further comprising a liquid crystal (LC) layer mounted between the first and the second substrates.

13. The MVA LCD device as claimed in claim 10, wherein the first substrate further comprises a color filter mounted between the first substrate and the top electrode.

14. The MVA LCD device as claimed in claim 10, wherein the second substrate further comprises a protection layer formed over the gate insulation layer, and the pixel electrodes are located on parts of the surface of the protection layer.

15. The MVA LCD device as claimed in claim 14, wherein the second substrate further comprises a vertical alignment layer over the pixel electrodes and the remaining surface of the protection layer.

16. The MVA LCD device as claimed in claim 10, wherein the range of pixel voltages of the first and the second, and the third sub-pixel unit is from 0.5 V to 2V.

17. The MVA LCD device as claimed in claim 10, wherein the first and the second coupling electrode signals are phase-inverted.

18. The MVA LCD device as claimed in claim 10, wherein the first sub-pixel unit has an aperture ratio equal to the third sub-pixel unit.

19. The MVA LCD device as claimed in claim 10, wherein the first sub-pixel unit has an aperture ratio smaller than the third sub-pixel unit.

20. The MVA LCD device as claimed in claim 16, wherein the pixel voltages of the first sub-pixel unit, the second sub-pixel unit and the third sub-pixel unit are different.

* * * * *